United States Patent
Gallant et al.

(10) Patent No.: US 9,610,738 B2
(45) Date of Patent: Apr. 4, 2017

(54) INSTALLATION FOR MAKING A FUSELAGE PORTION OF AN AIRCRAFT

(75) Inventors: Guillaume Gallant, Lareole (FR);
Romain Delahaye, Colomiers (FR)

(73) Assignee: Airbus Operations (S.A.S.), Toulouse (FR)

(*) Notice: Subject to any disclaimer, the term of this patent is extended or adjusted under 35 U.S.C. 154(b) by 985 days.

(21) Appl. No.: 13/321,644

(22) PCT Filed: May 25, 2010

(86) PCT No.: PCT/FR2010/051005
§ 371 (c)(1),
(2), (4) Date: Nov. 21, 2011

(87) PCT Pub. No.: WO2010/136717
PCT Pub. Date: Dec. 2, 2010

(65) Prior Publication Data
US 2012/0066907 A1 Mar. 22, 2012

(30) Foreign Application Priority Data

May 27, 2009 (FR) .................... 09 53493

(51) Int. Cl.
*B29C 70/86* (2006.01)
*B29C 33/30* (2006.01)
(Continued)

(52) U.S. Cl.
CPC ............ *B29C 70/86* (2013.01); *B29C 33/301* (2013.01); *B64C 1/061* (2013.01); *B64C 1/12* (2013.01); *B64F 5/0009* (2013.01); *B64F 5/0036* (2013.01); *B29L 2031/3082* (2013.01); *B64C 2001/0072* (2013.01); *Y02T 50/433* (2013.01);
(Continued)

(58) Field of Classification Search
CPC .................. B29C 33/301; B29C 70/86; B29L 2031/2082; B64C 1/12; B64C 1/061; B64C 2001/0072; B64F 5/0009; B64F 5/0036; B64B 1/08; Y10T 29/53478; A63H 27/02
See application file for complete search history.

(56) References Cited

U.S. PATENT DOCUMENTS 1,572,166 A * 2/1926 Smith .................. A63H 27/001
446/232
2,281,792 A * 5/1942 Ott ......................... A63H 27/02
446/34
(Continued)

FOREIGN PATENT DOCUMENTS

DE 100 30 499 A1 1/2002
DE 10030499 B4 * 3/2006
(Continued)

OTHER PUBLICATIONS

Written Opinion of the International Searching Authority issued in Application No. PCT/FR2010/051005; Dated Feb. 14, 2011.
(Continued)

*Primary Examiner* — Jacob Cigna
(74) *Attorney, Agent, or Firm* — Jenkins, Wilson, Taylor & Hunt, P.A.

(57) ABSTRACT

In the method of making an aircraft a mandrel is caused to pass through frames carried by a magazine; and as it passes through, the frames are transferred onto the mandrel.

8 Claims, 3 Drawing Sheets

(51) Int. Cl.
  *B64C 1/06* (2006.01)
  *B64C 1/12* (2006.01)
  *B64F 5/00* (2017.01)
  *B29L 31/30* (2006.01)
  *B64C 1/00* (2006.01)

(52) U.S. Cl.
  CPC .... *Y10T 29/49622* (2015.01); *Y10T 29/53478* (2015.01)

(56) References Cited

U.S. PATENT DOCUMENTS

| | | | | |
|---|---|---|---|---|
| 2,370,083 A * | 2/1945 | Smith | ........... | B64F 5/0009 29/462 |
| 2,374,894 A * | 5/1945 | Pioch | ........... | B64F 5/0009 24/17 R |
| 3,068,477 A * | 12/1962 | Tennyson | ........... | 343/709 |
| 3,337,164 A * | 8/1967 | Scott | ........... | B64C 1/068 244/119 |
| D232,711 S * | 9/1974 | Kirchner | ........... | 244/13 |
| 3,978,256 A | 8/1976 | James | | |
| 4,637,540 A | 1/1987 | Fujita et al. | | |
| 4,717,330 A | 1/1988 | Sarh | | |
| 5,223,067 A | 6/1993 | Hamamoto et al. | | |
| 5,586,391 A * | 12/1996 | Micale | ........... | B23P 21/00 244/120 |
| 6,480,271 B1 * | 11/2002 | Cloud | ........... | G01C 25/00 356/140 |
| 6,692,681 B1 * | 2/2004 | Lunde | ........... | 264/510 |
| 7,166,251 B2 * | 1/2007 | Blankinship | ........... | 264/258 |
| 7,410,352 B2 * | 8/2008 | Sarh | ........... | 425/317 |
| 7,503,368 B2 * | 3/2009 | Chapman et al. | ........... | 156/425 |
| 7,527,222 B2 * | 5/2009 | Biornstad et al. | ........... | 244/120 |
| 8,173,055 B2 * | 5/2012 | Sarh | ........... | 264/219 |
| 8,240,607 B2 * | 8/2012 | Pahl | ........... | 244/120 |
| 8,303,758 B2 * | 11/2012 | Chapman et al. | ........... | 156/287 |
| 8,534,605 B2 * | 9/2013 | Haack | ........... | 244/120 |
| 2004/0216805 A1 * | 11/2004 | Teufel | ........... | 141/11 |
| 2006/0108058 A1 * | 5/2006 | Chapman et al. | ........... | 156/245 |
| 2006/0118235 A1 * | 6/2006 | Lum et al. | ........... | 156/285 |
| 2006/0231682 A1 * | 10/2006 | Sarh | ........... | B29C 70/32 244/119 |
| 2008/0196825 A1 * | 8/2008 | Hamlyn | ........... | 156/232 |
| 2009/0020645 A1 * | 1/2009 | Cacciaguerra | ........... | 244/119 |
| 2009/0321569 A1 * | 12/2009 | Schroeer et al. | ........... | 244/119 |
| 2010/0181426 A1 * | 7/2010 | Haack | ........... | B64C 1/068 244/119 |
| 2012/0043009 A1 * | 2/2012 | Niermann et al. | ........... | 156/64 |
| 2012/0061513 A1 * | 3/2012 | Gallant | ........... | B64C 1/18 244/119 |

FOREIGN PATENT DOCUMENTS

| | | | |
|---|---|---|---|
| FR | 2 894 869 A1 | | 6/2007 |
| GB | 2268461 A | * | 1/1994 |
| WO | WO 2008000286 A1 | * | 1/2008 |
| WO | WO 2011154797 A2 | * | 12/2011 |

OTHER PUBLICATIONS

Japanese Office Action issued in Japanese Patent Application No. 2012-512433 on Mar. 4, 2014 (with translation).
French Search Report issued in Application No. 0953493; Dated Jan. 29, 2010 (With Translation).
International Search Report issued in Application No. PCT/FR2010/051005; Dated Feb. 14, 2011 (With Translation).

* cited by examiner

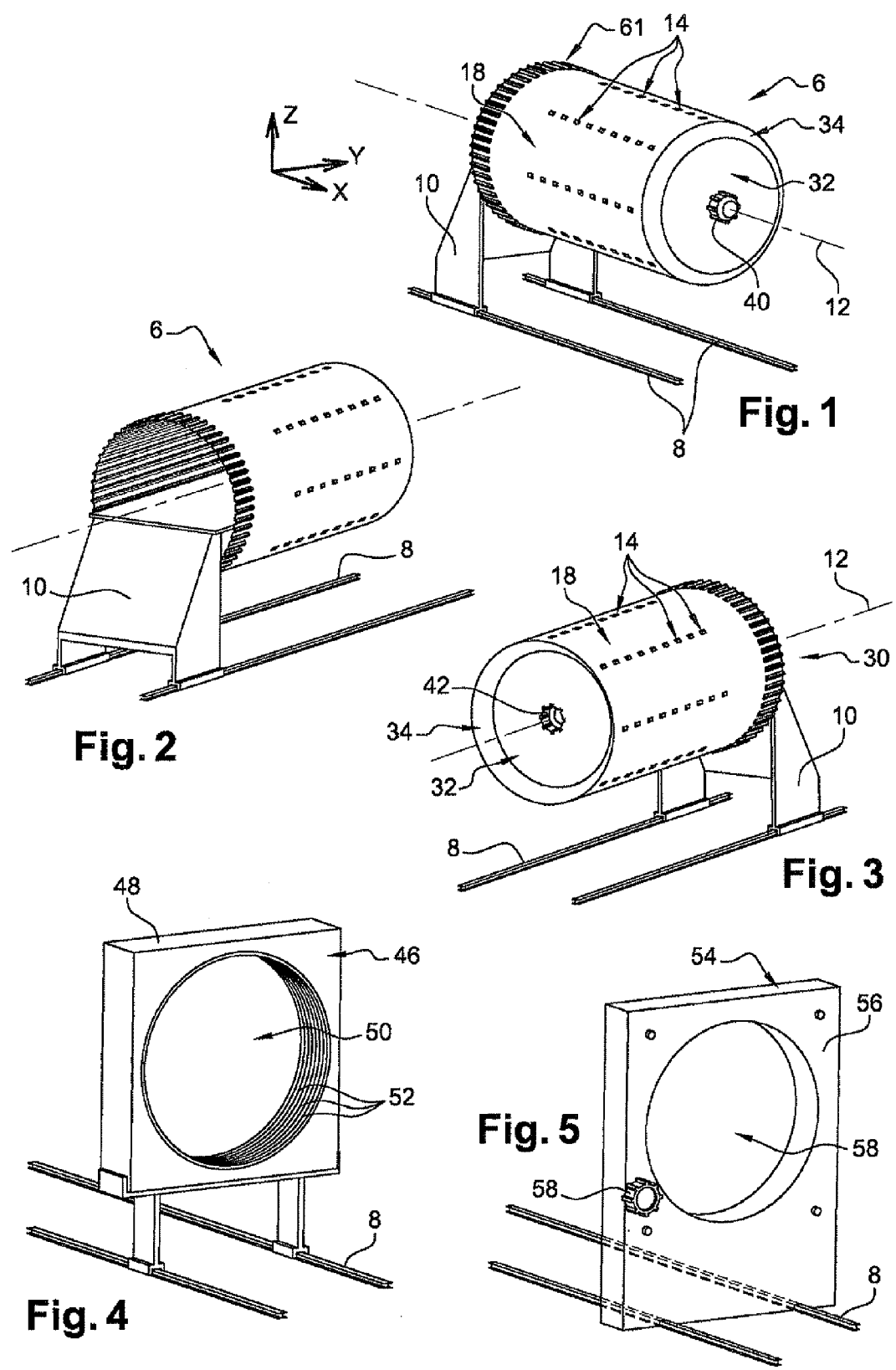

INSTALLATION FOR MAKING A FUSELAGE PORTION OF AN AIRCRAFT

BACKGROUND OF THE INVENTION

The invention relates to making aircraft.

It is known, in particular from document FR 2 894 869, to make the fuselage of an airplane by means of frames that are covered in a skin. The frames are circular in shape and form the framework of the fuselage. The frames are placed one by one on a mandrel which carries them in their final relative positions. The frames are then connected to one another, associated with other parts of the framework, and covered with a skin. Nevertheless, that assembly technique gives rise to cycle times that are relatively lengthy, with high recurrent costs.

OBJECT AND SUMMARY OF THE INVENTION

An object of the invention is to reduce cycle times and recurrent costs, and also to simplify the assembly of a segment of the fuselage by automating it.

To this end, the invention provides a method of making an aircraft wherein at least one mandrel is caused to pass through frames carried by a magazine, with the frames being transferred onto the mandrel as it passes through.

This serves to simplify and accelerate the operation of putting the frames into place on the mandrel. This makes it possible to reduce cycle times and also to reduce recurrent costs. This simplification of the assembly process also makes it easier to automate.

Preferably:

the magazine is filled with frames;

the magazine is put into place; and then with the magazine stationary, the mandrel is caused to pass through the frames.

It is thus possible to fill the magazine remotely from the assembly line, and then to transport the magazine to the assembly site. The operation of filling the magazine therefore does itself interfere with performing assembly.

Advantageously, the mandrel is caused to pass through the magazine.

It is advantageous to have a magazine that supports the frames over a major fraction of their circumference, which circumference is generally closed.

Preferably, the transfer is performed in such a manner that the frames present mutual spacing on the mandrel that is greater than their mutual spacing in the magazine, their mutual spacing on the mandrel preferably being equal to their final spacing in the aircraft.

This further simplifies assembly and also facilitates automation.

Advantageously, two mandrels are caused to pass through frames carried by two respective magazines by moving the mandrels towards each other.

This implementation is suitable for a fuselage segment of length that is relatively long compared with its diameter. The use of two mandrels serves to reduce the extent to which either of them is cantilevered out.

Advantageously, the mandrels are fastened to one another, in particular by constraining them in rotation.

This improves overall stability during fabrication.

Advantageously, at least one skin is fitted onto the frames.

The invention also provides an installation for making an aircraft, which installation comprises:

at least one frame magazine;

at least one mandrel; and transfer means for transferring frames carried by the magazine onto the mandrel, while the mandrel is passing through the frames.

The installation of the invention may also present at least one of the following characteristics:

the transfer means are carried by the mandrel;

the mandrel includes fastener means for fastening the frames on the mandrel, said fastener means preferably being formed at least in part by the transfer means; and the fastener means are mounted on the mandrel to move between a retracted position and an extended position in which they project farther from the mandrel than when in the retracted position, for example a portion of the fastener means being pivotally mounted on the mandrel about an axis that is locally parallel to a circumferential direction of the mandrel.

BRIEF DESCRIPTION OF THE DRAWINGS

Other characteristics and advantages of the invention appear further from the following description of an embodiment given by way of non-limiting example with reference to the accompanying drawings, in which:

FIGS. 1 and 2 are perspective views of a first mandrel of an installation of the invention;

FIGS. 3 to 5 are perspective views of a second mandrel, of a magazine, and of a stand of the installation;

MORE DETAILED DESCRIPTION

There follows a description of an embodiment of an installation of the invention for making an aircraft. Specifically, the aircraft is an aerodyne, and in the present example an airplane having a fuselage 2 with a segment thereof being shown in FIGS. 6 to 12.

In the description below, a conventional X, Y, and Z frame of reference is used in which the direction X designates the longitudinal direction of the fuselage, the direction Y designates the transverse horizontal direction, and the direction Z designates the vertical direction.

The fuselage presents a section of generally circular shape in a plane perpendicular to its longitudinal direction X. It is made up of a plurality of segments of the type fabricated in the manner described below, which segments are subsequently fastened together end to end.

Figure 6:
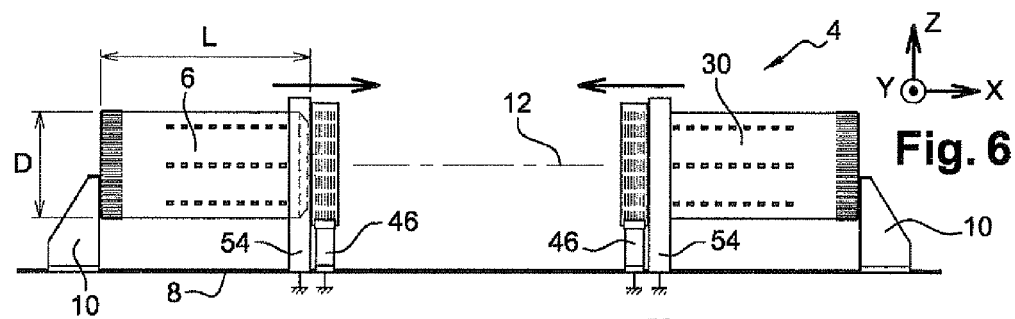
FIGS. 6, 7, 9, 10, 11, and 12 show implementation steps of the method of the invention using the installation of FIGS. 1 to 5.

The installation 4 is shown as a whole in FIG. 6. With reference to FIGS. 1 and 2, in the present example the installation comprises a first mandrel 6 and two rails 8 extending parallel to the direction X and fastened to the ground. The mandrel is fastened to a support 10 that serves to mount it so as to be movable in sliding along the rail 8 in the direction X. The mandrel presents a side face of generally cylindrical shape about an axis 12 that is parallel to the direction X, and of section perpendicular to said axis that is generally circular in shape. The mandrel is mounted to be movable in rotation about its longitudinal axis, which corresponds to the axis 12 of the cylinder. FIG. 1 shows the front of the mandrel and FIG. 2 shows the rear of the mandrel. The mandrel 6 presents a plane front face 32 perpendicular to the axis 12. The junction between the front face 32 and the side face 18 takes place via a chamfer 34.

Figure 8:
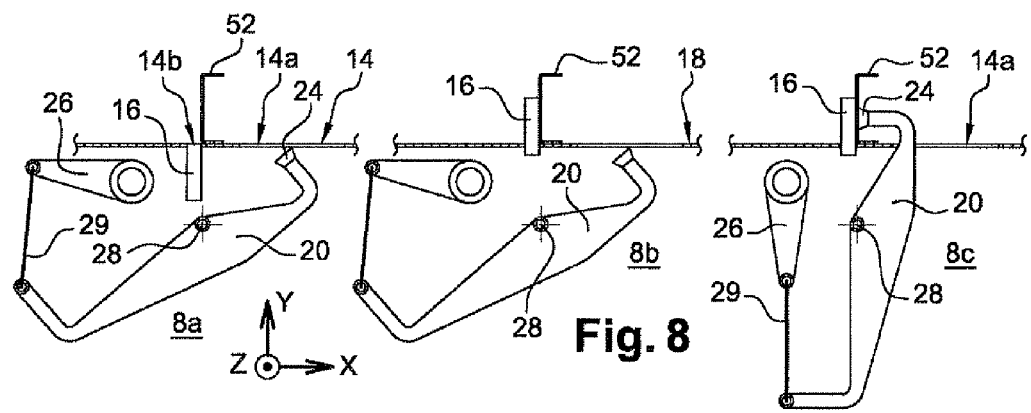
FIG. 8 comprises section views on a larger scale on plane VIII-VIII of the installation as shown in FIG. 7, during three operating steps.

In its cylindrical wall, the mandrel presents orifices 14 that are distributed as a plurality of rows parallel to the axis 12. There are eight such rows in this example, which rows are regularly distributed around the axis 12. Each of them has a plurality of orifices, specifically nine in each row. This number may vary as a function of the number of frames in the segment (see below), i.e. on the length of the segment that is to be assembled. The orifices of the rows form ranks that occupy successive respective planes that are perpendicular to the axis 12. As shown in FIG. 8, each orifice 14 is rectangular in shape. It presents a front portion 14a and a rear portion 14b that are spaced apart from each other along the direction X by a portion of the wall of the mandrel.

The mandrel 6 includes fastener means 16, 20 that are secured to the mandrel and suitable for holding frames 52 of the fuselage on the mandrel, as described below. These means comprise elements that are mounted to move on the mandrel between a retracted position and an extended position in which they project farther from the mandrel in a direction that is radial relative to the axis 12, and as compared with their retracted position. Specifically, these elements comprise pegs 16 of elongate rectilinear shape that extend in radial directions. In the retracted position, as shown in FIG. 8a, the pegs extend inside the mandrel without projecting beyond the face 18 of the mandrel. In the extended position as shown in FIGS. 8b and 8c, the pegs 16 have portions that project from said face through the portions 14b of the orifices. The pegs 16 are suitable for bearing against rear zones of the frame 52.

The fastener means also comprise elements 20 suitable for bearing against front zones of the frames. In the present example, these elements comprise hook-shaped clips 20 with the outer free end of each hook presenting a pad 24. Each clip is mounted to pivot about an axis 28, that is locally parallel to the circumferential direction of the mandrel. It therefore extends in a plane parallel to the directions Y and Z. With reference to FIGS. 8a and 8b, a clip may thus occupy a retracted position in which it extends inside the mandrel without projecting beyond the face 18. In the extended position shown in FIG. 8c, the clip 20 extends through the front portion 14a of the corresponding orifice, projecting from the face 18 of the mandrel. Each orifice 14 of the mandrel is thus associated with a unit comprising a peg 16 and a clip 20.

An appropriate mechanism is provided inside the mandrel to enable these elements to be actuated in the context of the method that is described below. Specifically, the clip may be driven by a rotary crank 26 acting via a connecting rod 29. The axis of the crank is parallel to the axis 28.

Specifically, the installation 4 includes a second mandrel 30 that is constituted in the same manner as the first mandrel 6, except for the following characteristics. The second mandrel 30 also presents a front face 32, however this front face is set back from a front edge of the side face 18 so as to form a cavity at the front of the mandrel. Once more, the faces 32 and 18 of the second mandrel are separated by a chamfer. Whereas the first mandrel 6 is shaped to form a male portion, the second mandrel 30 is shaped to form a female portion suitable for receiving the male portion of the first mandrel, with the front walls 32 coming into surface-on-surface contact with each other, as do the two conical chamfers 34. The two mandrels may thus be arranged in axial alignment, one extending the other.

The installation also includes means for engaging the two mandrels in rotary manner, e.g. if it is desired to drive one mandrel in rotation with the other. Specifically, these means comprise a splined wheel or dog 40 projecting from the front face 32 of the first mandrel and suitable for penetrating into a recess 42 in the front face 32 of the second mandrel. The recess 42 presents a female shape matching the male shape of the wheel 40. When the two mandrels are coupled together, the wheel of the first mandrel engages the second mandrel by meshing in the recess 42, thereby constraining the mandrels together in rotation about the axis 12.

With reference to FIG. 4, the installation 4 has a first magazine 46 for the first mandrel and a second magazine 46, identical to the first, for the second mandrel. Each magazine comprises a box 48 generally in the form of a rectangular parallelepiped. The box is flat and extends mainly in a plane parallel to the directions Y and Z. It presents an opening 50 in its center. The magazine is suitable for receiving frames 52 of the fuselage. The frames 52 are plane and circular in shape. They are received in the opening, each being arranged in a vertical plane perpendicular to the direction X. The frames are thus stored in parallel and on a common axis, in contact with one another, one after the next.

The installation also includes two stands 54, each associated with a respective one of the mandrels 6 and 30. Each stand 54 comprises a box 56 of shape analogous to the box 48 of each magazine. At least one of the stands includes drive means 58 enabling the associated mandrel to be driven in rotation when it is received through the central opening 58 of the stand. For this purpose, these means comprise a wheel that is contiguous with the opening and that presents teeth suitable for meshing with a set of teeth 61 provided specifically at the rear end of the side face 18 of the mandrel. It suffices for only one of the stands to include such drive means, with the other stand serving merely to provide rotary guidance. However it is also possible for both stands to be provided with such drive means.

With reference to FIG. 6, preferably, each mandrel has a total length L that is less than twice its outside diameter D. Preferably, this length L is even less than 1.5 times said diameter, e.g. being less than or equal to the diameter. This avoids constituting mandrels that are excessively cantilevered since that would lead to the tooling sagging under its own weight plus the weight of the fuselage.

The installation also includes control means that may be automated in full or in part and that serve to implement the assembly method as described below with reference to FIGS. 6 to 12.

In a first step that is not shown, each of the magazines 46 is supplied with a plurality of frames 52. Specifically, this is performed remotely from the assembly line with the magazine being moved away initially from the other parts of the installation 4. Once the magazine has been filled, it is put back into place on the rails 8.

In a second step that is shown in FIG. 6, the various elements of the installation are arranged on the rails 8 in this order starting from the left:

the first mandrel 6 with its support 10 on the left thereof;
the associated stand 54;
the associated magazine 46; and then separated from the above elements by a space:
the magazine 46 associated with the second mandrel 30;
the stand 54 associated with the second mandrel; and
the second mandrel and its support on the right thereof.

The two supports 10 are the two portions of the installation that are furthest apart from each other on the rails 8. The stand 54 associated with the first mandrel is in abutment in the direction X against the rear face of the magazine 46 which provides it with a position reference. The front end of the first mandrel 6 penetrates into the opening 58 of the stand, but not yet into the opening 50 of the magazine. The elements associated with the second mandrel 30, including the second mandrel itself, are symmetrical to those associated with the first mandrel 6 in the installation about a plane of symmetry parallel to the directions Y and Z.

Figure 12:
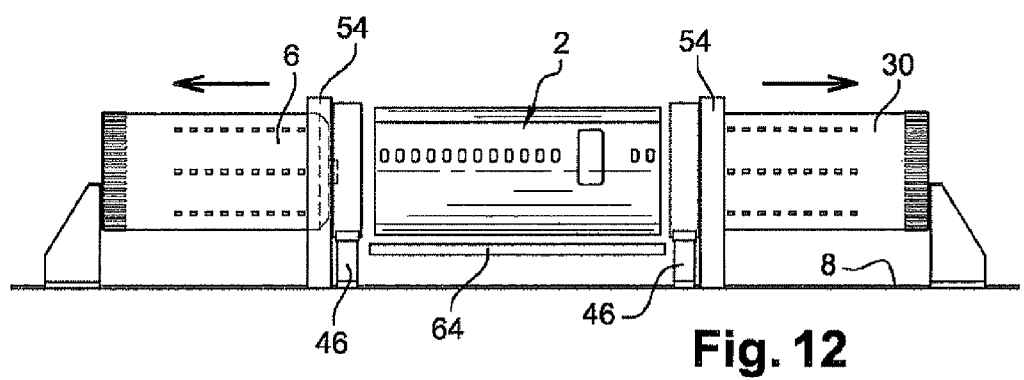

At this stage of fabrication, and up to the step of FIG. 12 included, the magazines 46 and the stands 54 are rigidly fastened to the rails 8, being prevented from moving both relative to the ground and relative to each other. In the description below, only the mandrels 6 and 30 are movable along the rails in the direction X. The pegs 16 and the parts 20 are initially in the retracted position.

Figure 7:
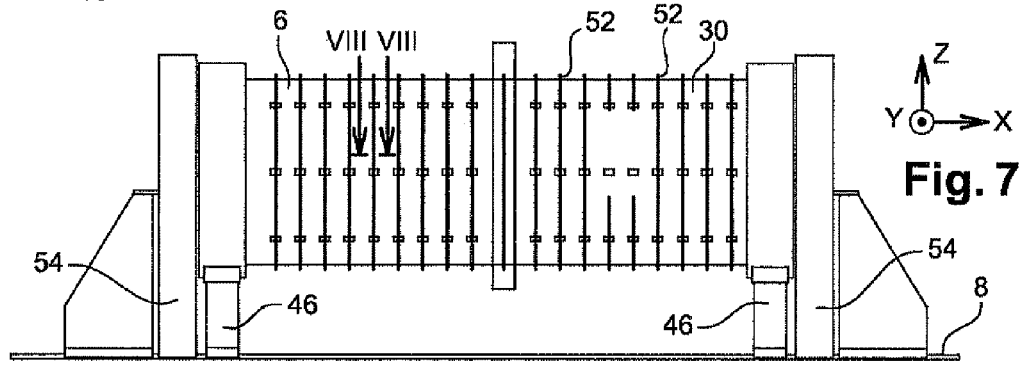

During the second step, the end of which is shown in FIG. 7, the first mandrel 6 is caused to pass through the stand 54 and the associated magazine 46 by moving the first mandrel along the rails 8. The same is done for the other mandrel, such that both mandrels move towards each other until they come into contact with each other and are coupled together as shown in FIG. 7.

For each mandrel, during this movement, the means 16 and 20 are actuated in such a manner that the pegs 16 situated in the first rank in each of the rows are extended radially when they come into register with the gap between the first and second frames 52 of the magazine 46, these frames being the frames furthest from the support 10. This extension may be made easier by giving the distal ends of the pegs 16 a chamfered shape. As the mandrel goes past, extending the pegs 16 thus enables the mandrel to take with it the first frame 52 in the series. Once this engagement has begun, the clip 20 also moves into an extended position. The frame 52 is thus rigidly held in position on the mandrel via its rear face by the pegs 16 and via its front face by the clips 20. Specific means could equally well be provided for preventing any rotation of the frame relative to the mandrel about the axis X.

When the orifices 14 of the second rank in the rows come into register with the gap between the two front-most frames of the frames that remain in the magazine, the corresponding pegs 16 likewise pass into the extended position to take the front-most frame 52 away on the mandrel in the same manner. The associated clips 20 then pass into their extended positions.

The various frames are thus transferred progressively from the magazine onto the associated mandrel. During this transfer, the frames are placed in register with the respective orifices 14. Their mutual spacing thus becomes greater than the mutual spacing they had while stored in the magazine 46. In the present example, this spacing corresponds to the spacing that the frames are to have in their final positions in the airplane.

As shown in FIG. 7, after this step, all of the frames 52 have been extracted from the magazines (which are now empty) and they are to be found spread out along the mandrels. The mandrels are coupled together and their faces 18 form a continuous cylindrical surface.

Figure 9:
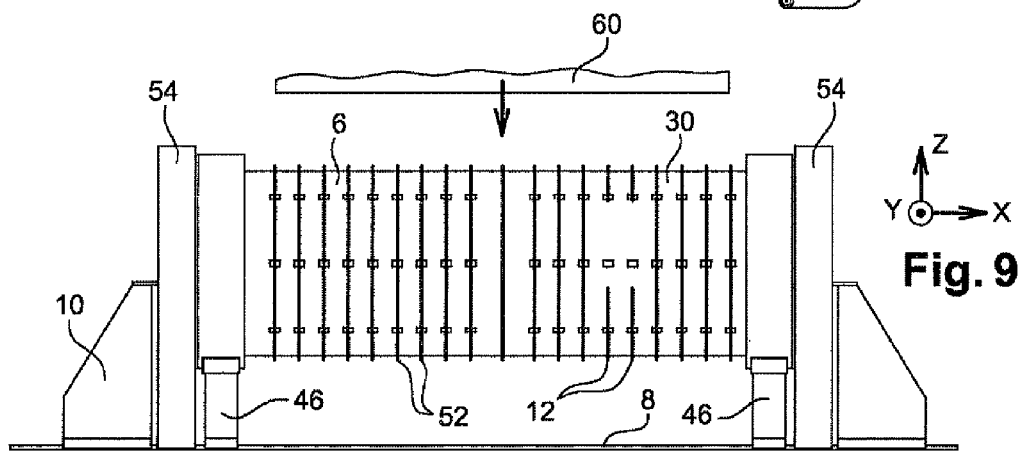

In a subsequent step shown in FIG. 9, a skin 60 is brought to the installation, specifically from above and in a direction that is radial relative to the axis 12. This skin preferably includes stringers that are preassembled on the skin. The skin is placed on the frames 52 and is fastened thereto. The stringers extend in the direction X.

Figure 10:
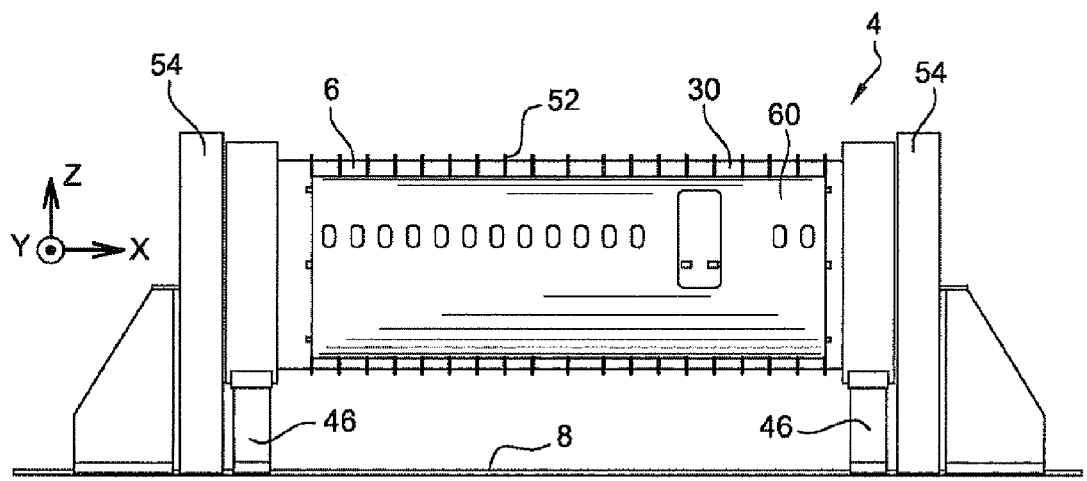

Using the stands 54, both mandrels are then caused to rotate together with the frames and the skin 60 that they carry, as shown in FIG. 10. This rotation gives operators better access to the skin 60. The skin is assembled onto the frames, e.g. using pop rivets that enable them to be installed while acting from the outside only.

Figure 11:
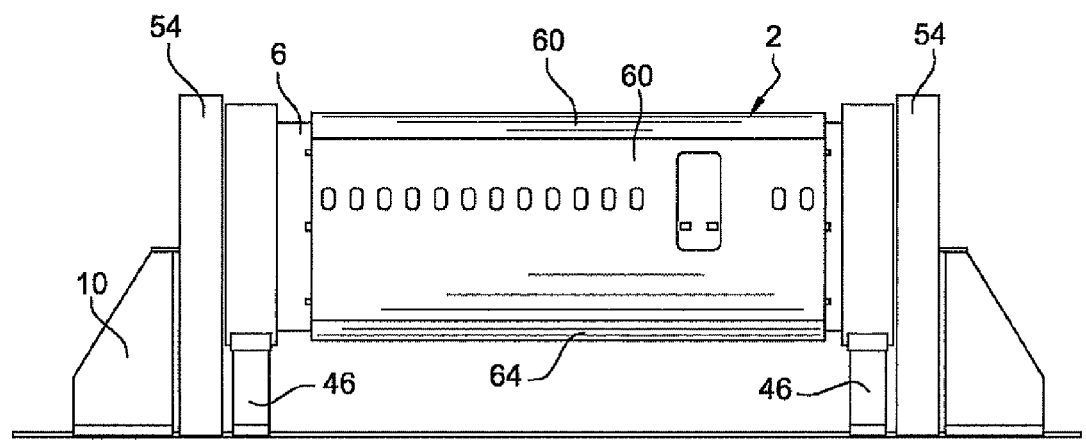

With reference to FIG. 11, another skin 60 is then installed in the same manner as that shown in FIG. 9. This skin occupies a position on the segment that is angularly offset relative to the position occupied by the first skin. All of the skin elements are put into place on the segment in this way while it is being made.

With reference to FIG. 12, a cradle 64 is then put into position under the segment of fuselage between the two magazines, so that the cradle 64 can support the segment that has been made in this way. Thereafter, once the pegs and the clips have been retracted, it is possible to move the two mandrels apart from each other along the direction X so as to release the segment. After that the segment is taken away from the installation while being carried by the cradle.

The same steps may then be implemented in order to fabricate another segment 2.

The invention is particularly adapted to making fuselage segments having skin panels of large dimensions, for the purpose of maximizing the advantage of automation (which is why two mandrels are used for supporting the weight of the tooling), and this applies regardless of whether the panels are made of composite material or of metal.

Naturally, numerous modifications may be applied to the invention without going beyond the ambit thereof.

The invention may be implemented using a single mandrel, e.g. supported in a cantilevered position on the rails 8.

The means for transferring the frames from the magazines onto the mandrels in this example form a portion of the means for retaining the frames on the mandrel. However, provision can be made for the transfer means to be distinct from the retaining means, e.g. being carried by the magazines.

Provision may be made for the individual movements of the transfer means to be controlled by an operator, e.g. remotely.

The invention claimed is:

1. A method of making an aerodyne, the method comprising:
   providing at least one magazine carrying individual frames; and
   causing at least one mandrel to pass through each of the individual frames carried by the at least one magazine, the at least one magazine having an opening that receives the individual frames, and the individual frames being transferred from the at least one magazine onto the at least one mandrel as the at least one mandrel passes through the individual frames,
   wherein a fuselage of the aerodyne comprises the individual frames, and
   wherein transfer is performed such that the individual frames present a mutual spacing on the at least one mandrel that is greater than a mutual spacing in the at least one magazine.

2. The method according to claim 1, further comprising:
   putting the at least one magazine, which is filled with the individual frames, into place; and
   causing, with the at least one magazine stationary, the at least one mandrel to pass through the individual frames.

3. The method according to claim 1, further comprising causing the at least one mandrel to pass through the at least one magazine.

4. The method according to claim 1, wherein the mutual spacing of the individual frames on the at least one mandrel is equal to a final spacing of the individual frames in the aerodyne.

5. The method according to claim 1, further comprising:
causing two mandrels to pass through individual frames carried by two respective magazines by moving the mandrels towards each other,
wherein the mandrels are fastened to one another by being constrained in rotation.

6. The method according to claim 1, wherein at least one skin is fitted onto the frames.

7. A method of making an aerodyne, the method comprising:
providing at least one magazine carrying individual frames;
passing at least one mandrel through each of the individual frames carried by the at least one magazine, the individual frames being transferred from the at least one magazine onto the at least one mandrel as the at least one mandrel passes through the individual frames; and
removing the at least one mandrel from the individual frames,
wherein a fuselage of the aerodyne comprises the individual frames, and
wherein transfer is performed such that the individual frames present a mutual spacing on the at least one mandrel that is greater than a mutual spacing in the at least one magazine.

8. A method of making an aerodyne, the method comprising:
providing at least one magazine carrying individual frames;
passing at least one mandrel through the at least one magazine that carries the individual frames; and
transferring the individual frames from the at least one magazine onto a portion of the at least one mandrel within an opening of the at least one magazine as the at least one mandrel passes through the at least one magazine,
wherein a fuselage of the aerodyne comprises the individual frames, and
wherein transfer is performed such that the individual frames present a mutual spacing on the at least one mandrel that is greater than a mutual spacing in the at least one magazine.

* * * * *